(12) United States Patent
Bernhardt

(10) Patent No.: US 6,292,222 B1
(45) Date of Patent: Sep. 18, 2001

(54) PROTECTIVE HOUSING FOR OPTICAL APPARATUS WITH A MOUNTING BODY FOR ATTACHMENT TO A MOUNTING SURFACE

(75) Inventor: Rainer Bernhardt, Rossbach (DE)

(73) Assignee: Videor Technical Services GmbH, Rodermark (DE)

( * ) Notice: Subject to any disclaimer, the term of this patent is extended or adjusted under 35 U.S.C. 154(b) by 0 days.

(21) Appl. No.: 09/024,007

(22) Filed: Feb. 14, 1998

(30) Foreign Application Priority Data

Feb. 13, 1997 (DE) .............................. 197 05 404
Oct. 28, 1997 (DE) .............................. 297 19 106

(51) Int. Cl.⁷ .................................................. H04N 5/225
(52) U.S. Cl. ........................................... 348/375; 348/143
(58) Field of Search ..................... 348/207, 211, 348/212, 213, 214, 335, 340, 373, 374, 375, 376, 81–87, 74–76, 143, 148, 149, 151, 152; H04N 5/225

(56) References Cited

U.S. PATENT DOCUMENTS

| 4,217,606 | 8/1980 | Nordmann . | |
|---|---|---|---|
| 4,736,218 | 4/1988 | Kutman . | |
| 4,855,838 | * 8/1989 | Jones et al. | 348/82 |
| 4,991,006 | * 2/1991 | Wood | 348/82 |
| 5,153,623 | 10/1992 | Bouvier . | |
| 5,214,245 | 5/1993 | Bernhart et al. . | |
| 5,443,235 | 8/1995 | Bernhardt . | |
| 5,598,207 | 1/1997 | Kormos . | |
| 5,610,656 | 3/1997 | Bernhart . | |
| 5,956,077 | * 9/1999 | Qureshi et al. | 348/82 |

FOREIGN PATENT DOCUMENTS

| 4008340 | 9/1991 | (DE) | H04N/5/225 |
|---|---|---|---|
| 4405626 | 2/1995 | (DE) | H04N/5/247 |
| 285922A3 | 10/1988 | (EP) | G08B/15/00 |
| 0446875 | 9/1991 | (EP) . | |
| 468839A1 | 1/1992 | (EP) | G08B/15/00 |
| 7205216 | 10/1972 | (NL) . | |

* cited by examiner

*Primary Examiner*—Tuan Ho
(74) *Attorney, Agent, or Firm*—Fulbright & Jaworski, LLP

(57) ABSTRACT

A protective housing for an optical apparatus has links, pivot axes and a mounting system for orienting the optical axis. The mounting system had a pivot axis which is aligned perpendicular to a mounting surface or contact surface, and has at least one additional pivot axis aligned perpendicular to the first pivot axis, which allows the optical axis to reach virtually all space coordinates, independent of the position of the contact surface.

16 Claims, 15 Drawing Sheets

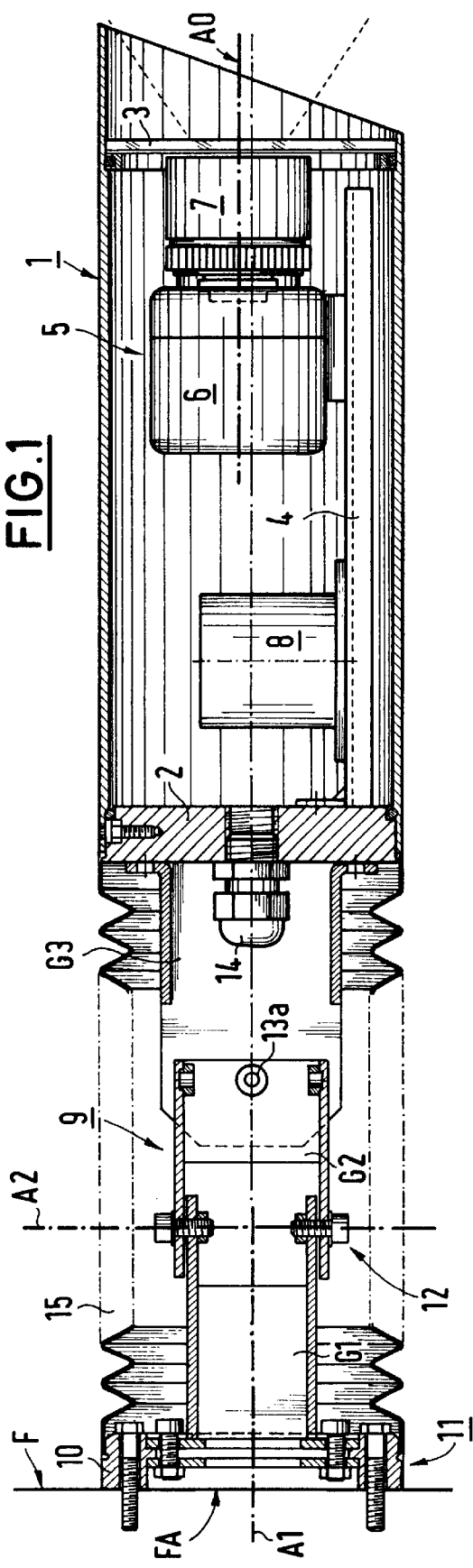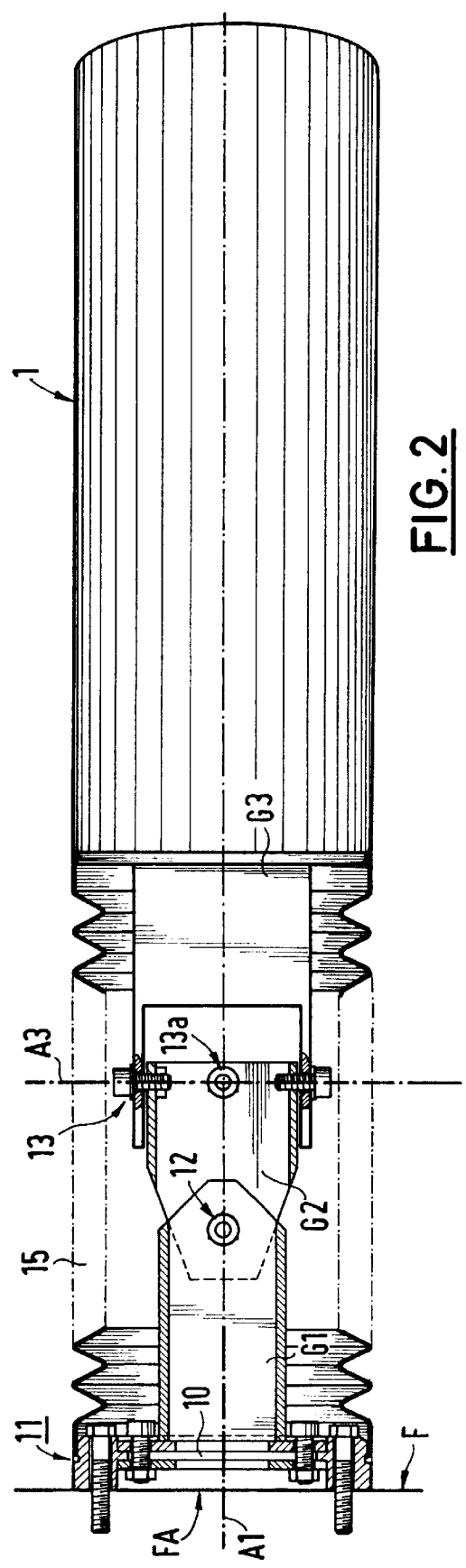

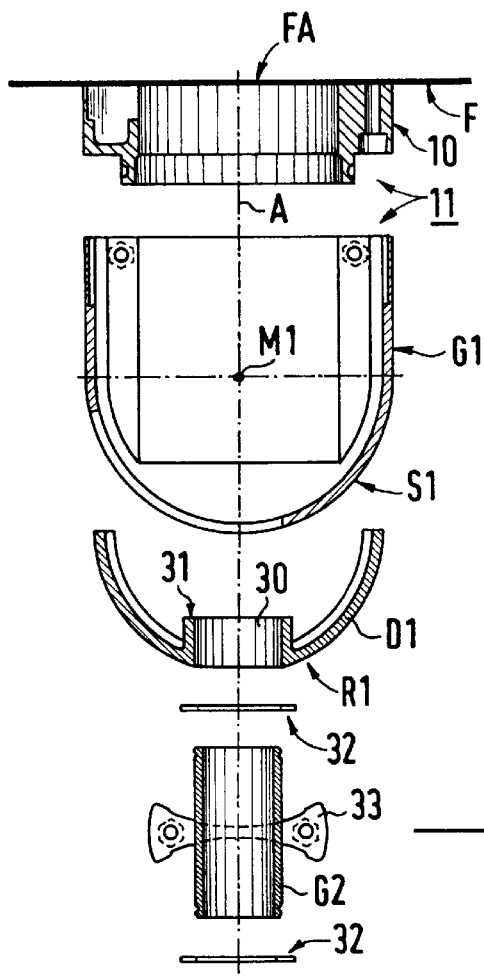
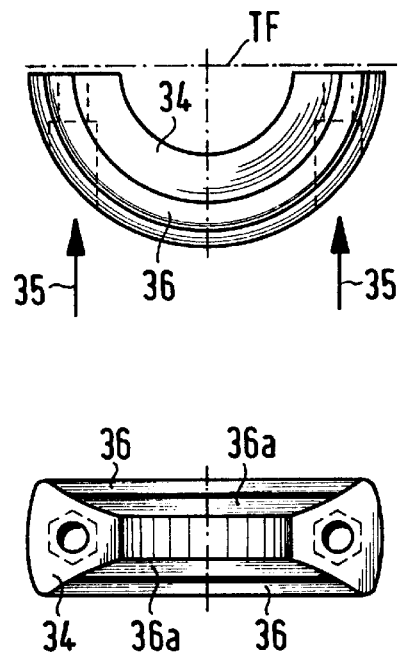
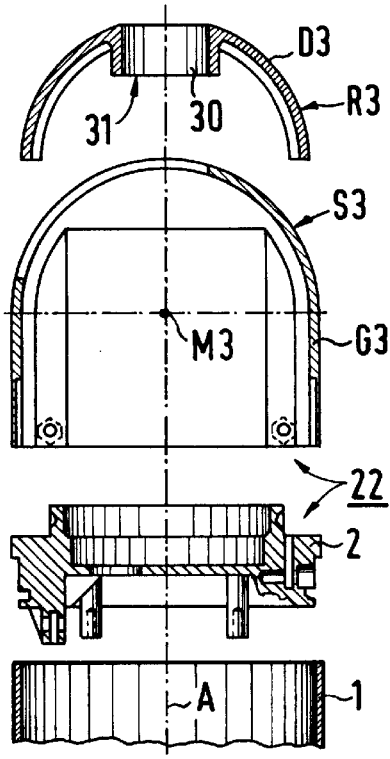
FIG. 14
FIG. 15
FIG. 16

PROTECTIVE HOUSING FOR OPTICAL APPARATUS WITH A MOUNTING BODY FOR ATTACHMENT TO A MOUNTING SURFACE

The invention relates to a protective housing with a back wall which is provided with a cable entrance, and with a window wall for optical apparatus with an optical axis, the protective housing having a fastening device with lockable joint members and pivots, and with a mounting body which has a lockable rotary receptacle with a first pivot axis and a contact surface for mounting on a mounting surface, wherein the pivot axis of the rotary receptacle is aligned perpendicular to the mounting surface and the fastening device has at least one additional pivot axis which is aligned perpendicular to the first pivot axis.

Such protective housings serve, for example but not exclusively, for housing video cameras, lamps and sensors (motion detectors) of security systems for land and buildings, especially in closed-circuit video surveillance systems. The protective housing in that case serves not only for protection against environmental influences such as weather, vapors and dust, but also against sabotage. A special problem is presented by the connecting cables to supply power and for transmitting the received signals. The power supply serves, for example, for heating the window wall to prevent condensation when such housings are installed out-of-doors and exposed to all kinds of weather. Such cables have a great number of wires and are accordingly stiff; they are, however, also extremely subject to sabotage. Cutting the cables results in complete failure of the apparatus in question.

It is known through German Patent 40 08 340 C2 to dispose protective housings for optical apparatus in the area of their center of gravity on a lockable tilt-and-swivel head with two pivot axes perpendicular to one another so as to be able to align the optical axis with a plurality of space coordinates. The mounting means in this case is a wall bracket which can be fastened only to at least approximately vertical surfaces. To suspend the known protective housing under a ceiling an additional ceiling mount is required. In order to protect the cable with the known system against acts of sabotage a separate cable cover is needed, which is carried from the tilt-and-swivel head along the bottom of the housing to the back wall of the latter in which receptacles for the cable connection are located. The known system has proven excellent in practice for expensive surveillance apparatus; it is, however, too expensive for simpler surveillance systems, and especially it is not possible with the wall bracket and various kinds of mounts to achieve all of the space coordinates for the optical axis, because the cable cover abuts against the wall bracket, for example. Any inserted spacers have the disadvantage that the system tends to vibrate, resulting in fuzzy images in the case of video cameras.

It is known through EP 0 285 922 A2 to fasten the backs of such housings on a vertical wall through a joint with a horizontal axis. In this case, however, the optical axis can rotate only in a vertical plane, and the known method is not suitable for mounting on the ceiling. Furthermore, no attention is given to the protection of the connecting cable. In the case of mounting on a horizontal surface, the known system provides for the customary support beneath the center of gravity of the protective housing, i.e., the orientation of the mounting surface determines the selection of the mounting means.

Public prior use has furthermore disclosed a wall mount which is connected through a Z-shaped coupling to the back of the housing. In the area of this coupling there are two axes which are perpendicular to one another but parallel to the wall surface, so that the optical axis can be set for different space coordinates. The known system is not suitable for ceiling mounting or for mounting over a horizontal surface, since for this purpose the swivel angles are too small; moreover, drawing the cable through the Z-shaped coupling is extraordinarily complicated.

EP 0 468 839 A1 discloses a video surveillance camera with an integrated wall and ceiling mount, in which the camera housing consists of two half shells assembled together, which do not necessarily need to be partially spherical shells. This camera housing is fitted into the mount, which is configured as a hollow body for carrying the cable concealed, but does not have to be fork-shaped but can also be one-sided. In any case what is involved is an integral unit in which the camera housing cannot be replaced with a conventional camera housing found on the market.

This known device has only two pivot axes, namely a first pivot axis U which runs through the junction(s) between camera housing and mount, and a second pivot axis V running perpendicular thereto which runs through the rotary junction of the mount with a mounting ring which can be screwed to a ceiling or wall surface (mounting surface), so that this second pivot axis V runs also perpendicular to this mounting surface. There is also mention of a third axis W, but it is only a shaft for displacement of the camera and is said to run parallel to the mounting surface.

Thus it has the following relationship: as long as the mount is fastened to a horizontal mounting surface, if the image margins are precisely perpendicular and horizontal, virtually all of the space coordinates this side of the mounting surface can be achieved with the optical axis. If, however, the mount is fastened to a non-horizontal, e.g., a vertical mounting surface, then the ability of the optical axis to rotate applies only to two extreme cases: In the first case the optical axis must be rotated about axis V, with only the mount rotating, in a plane which is precisely parallel to the mounting surface; in the second case the optical axis must be rotated about the axis U, with only the camera housing rotating, in a plane which is precisely perpendicular to the mounting surface. In all other cases, i.e., in the most frequently occurring intermediate positions, an interaction of rotations about both axes U and V is necessary, which automatically results in a tilting of the horizontal and vertical margins of the image. No compensation is provided for this, and a parallel displacement of the camera along the coordinate W parallel to the mounting surface, for which no means are given, would not correct this tilt.

Moreover, during the integration of mount and camera housing the cable or cables must be drawn around several corners which, with the stiffness of the commonly used, necessarily shielded cable, is difficult if not impossible. The drawing in of the cable must be performed at the place of manufacture and cannot be performed during assembly when, for example, only the camera and camera housing are to be replaced in order to modernize the system.

The invention is therefore addressed to the problem of devising a protective housing of the kind described in the beginning, which can be joined structurally to a mounting system without involving difficulty in drawing even stiff cables through it, and which permits the attachment and adjustment of the protective housing, independently of the position in space of the mounting surface, in the greatest variety of attitudes of the optical axis, without additional components, and without tilting the margins of the image.

The solution of the stated problem is accomplished in two first embodiments according to the invention in that a) three links are disposed between the back wall and the mount body, the first link being joined to the mount body through the swivel and the third link to the back wall, b) in the case of two additional pivot axes between the links these axes are perpendicular to one another and to the axis of the swivel, and when the protective housing is in the mounted state, one of the additional pivot axes is horizontal and the other pivot axis is perpendicular, and that c) the links surround a cable tunnel which can be brought substantially into the outstretched position and which leads to the cable entrance in the back wall.

The stated problem is solved in a third embodiment by the fact that a) between the back wall and the mount body at least two links are disposed, b) the first link is connected through the rotary receptacle to the mounting body and the last link is connected to the back wall through an additional lockable rotary receptacle which has an additional pivot axis which passes through the back wall and runs parallel to the optical axis (AO), and through which the protective housing can be rotated relative to the last link and to the at least one additional pivot axis, and that c) the links contain a cable tunnel which can be brought substantially to the outstretched position, and which leads to the cable entrance in the back wall.

By configuring the mounting device according to the invention it is brought about, in the simplest manner, that virtually all space coordinates can be achieved with the optical axis, virtually regardless of the position of the mounting surface. The mounting device runs between the back wall of the protective housing and the mounting body, forming a unit with the protective housing, which does not mean that a one-piece construction is necessary or that a replacement of the housing would not be possible. A Z-shaped configuration of one or more of the links is avoided, so that there is no difficulty in drawing even stiff cables through it. In the case of temporary mounting the links are quite simply put into an outstretched position so that they wholly or partially surround a straight cable tunnel of large cross section. Only when the optical system is set into position for use are the links locked up with their axes in position. Details and the advantages connected therewith will be further explained in the detailed description.

At the same time it is especially advantageous if, either individually or in combination:

the first link, at least partially surrounding the first axis of rotation, is inserted by means of a rotary flange plate into the rotary receptacle, if between the link disposed on the rotary receptacle and the link disposed on the back wall a middle link is disposed, in the case of an arrangement of three links, if the axes of rotation between the links are parallel to one another, if at least one of the links has a U-shaped cross section on at least a portion of its length, if at least one of the links has a tubular cross section on at least a portion of its length, if the links are contained within a bellows which is connected at its one end to the mounting body and at its other end to the back wall of the protective housing, if the last link is inserted by means of a rotary annular flange into the lockable receptacle in the back wall of the protective housing, a) if the first link and the third link each have a partially spherical shell whose exterior surfaces face one another and have each an opening; if the first pivot axis and the second pivot axis are perpendicular to one another, and pass through the center of the partially spherical shell of the first link, and if the third pivot axis passes through the center of the partially spherical shell of the third link, and b) if the second link is configured as a rectilinear hollow body and passes through the openings for pivoting about the centers of the partially spherical shells, and c) if in the interior of the partially spherical shells, thrust bodies are disposed with external surfaces of rotation, which at least partially overlap the openings and are connected at both ends in a tension resistant manner to both ends of the second link, and if d) clamping means are provided by which the two thrust bodies and with them the second link can be locked against rotation and displacement to the partially spherical shells, if the second and the third pivot axes run parallel to one another through the centers of the two partially spherical shells, if the clamping means is an axially divided clamp component disposed between the partially spherical shells and surrounding the second link, with concave pressure surfaces adapted to the partially spherical shells, by the radial drawing together of which the partially spherical shells can be pressed against the two thrust bodies, if the openings in the partially spherical shells are slot-like and defined by parallel edges whose distance apart corresponds to the external cross sections of the second link, and if the openings extend at least between the axis and the edge of the partially spherical shells, if the partially spherical shells are prolonged at their base by a hollow cylindrical section of the same diameter, if the second link is configured as a hollow cylinder, or if the second link is configured as a rectangular tube, or if the partially spherical shell of the third link is connected by a swivel socket to the protective housing.

The subject matter of the invention creates a cable tunnel of great cross section, which during initial set-up can be brought into an outstretched state. This facilitates the introduction of the cable enormously.

In particular, a series arrangement of links is formed, which can be brought into an outstretched state, thereby again facilitating the introduction of a stiff and bulky cable. In any case, too, the links—depending on their shape—constitute very good protection against sabotage of the cable.

If the second pivot axis and the third pivot axis are parallel to one another, a very great swivel angle is permitted without a sharp bend.

If the second pivot axis and the third pivot axis are perpendicular to one another and run to the first pivot axis, an extended and lockable universal joint linkage is formed which in an especially universal manner permits a great number of orientations of the optical axis.

It is furthermore possible in that case to give at least one of the links a U-shaped cross section on at least a portion of its length, thus immediately achieving extensive cable protection. It is, however, especially advantageous if at least one of the links has a tubular cross section on at least a portion of its length, the term, "tubular" including both round and square or rectangular or even polygonal cross sections. In the described manner, a complete protection of the cable is achieved over the entire length.

It is lastly especially advantageous if the links are contained in a bellows, especially if the bellows is connected at its one end to the mounting body and at its other end to the back wall of the protective housing.

In this manner not only is reliable protection against weather achieved, but also additional protection against sabotage, simply due to the fact that the course of the cable cannot easily be seen from the outside. The use of a bellows on the circumference of the links is especially favored if the second and the third pivot axes are parallel to one another, because this enables the curvature of the bellows to be distributed over a greater length.

One very particularly advantageous embodiment of the invention is characterized in that an additional pivot axis is provided for the relative rotation of the protective housing with respect to the mounting body and the links, passing through the back wall and running parallel to the optical axis. At the same time the back wall of the protective housing advantageously has an additional lockable rotary receptacle into which the last link is inserted by means of an additional rotary annular flange, and at least partially surrounds the last pivot axis and thus forms a channel for the cable.

Thus, if two rotary receptacles are present, the series of links can be rotated with respect to the first rotary receptacle and with respect to the second rotary receptacle and the protective housing and locked again, so that the number of degrees of liberty is further increased. In all cases the vertical image axis of a video camera can also be aligned vertically. For reasons of simplification it is especially advantageous if both of the rotary receptacles are composed at least predominantly of the same components.

Embodiments of the invention will be explained below with the aid of FIGS. 1 to 24.

FIG. 1 is a vertical section taken through a protective housing and a first embodiment of a mounting system.

FIG. 2 is a partial horizontal section and partial plan view of the subject of FIG. 1.

FIG. 14 is an exploded view of a mount of a third embodiment between a mounting surface and the protective housing.

FIG. 15 shows half of a clamp component in the form of a half-ring as seen in the direction of the seam.

FIG. 16 is a plan view of the subject of FIG. 15 in the direction of the axis A—A in FIG. 14.

Figure 23A:
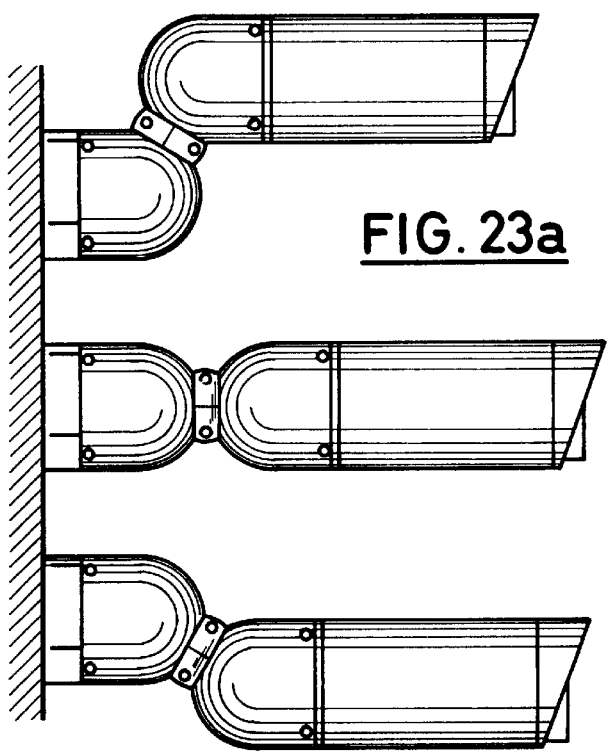
FIGS. 23a to 23i show on a greatly reduced scale the protective housing in different possible positions, namely.
Figure 23C:
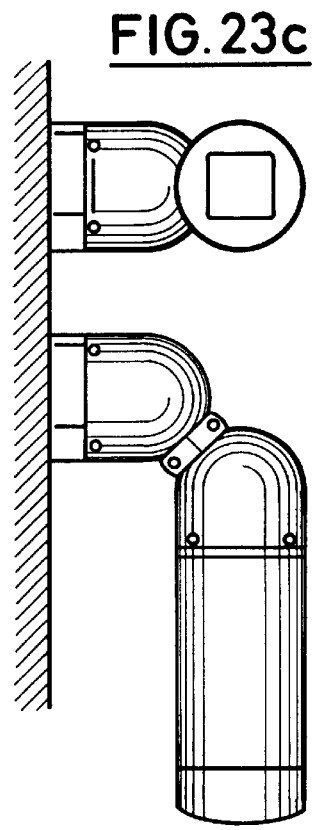
Figure 23B:
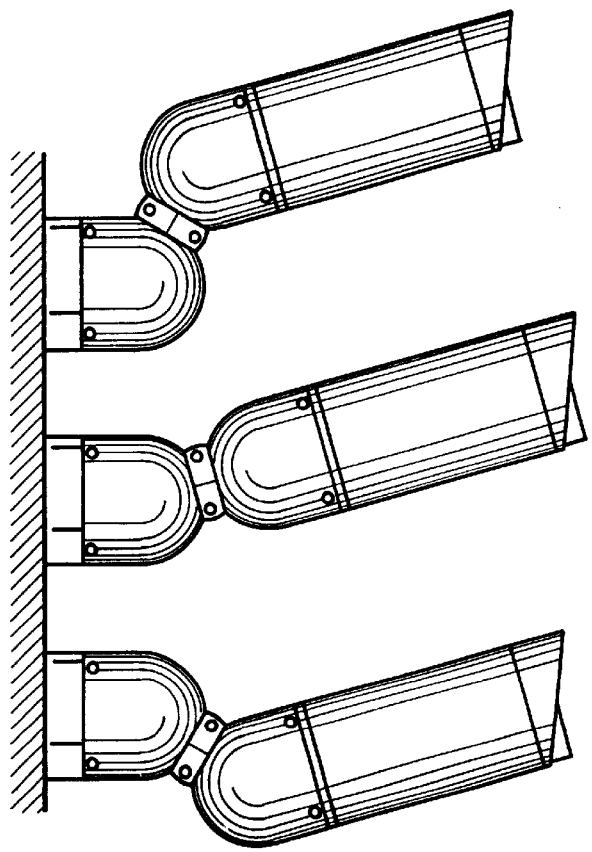
Figure 23D:
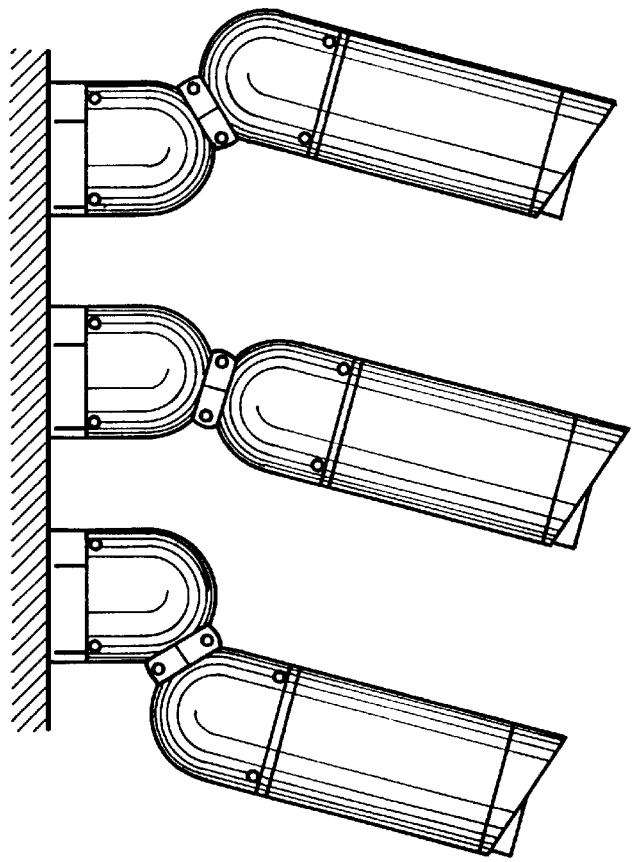
Figure 23E:
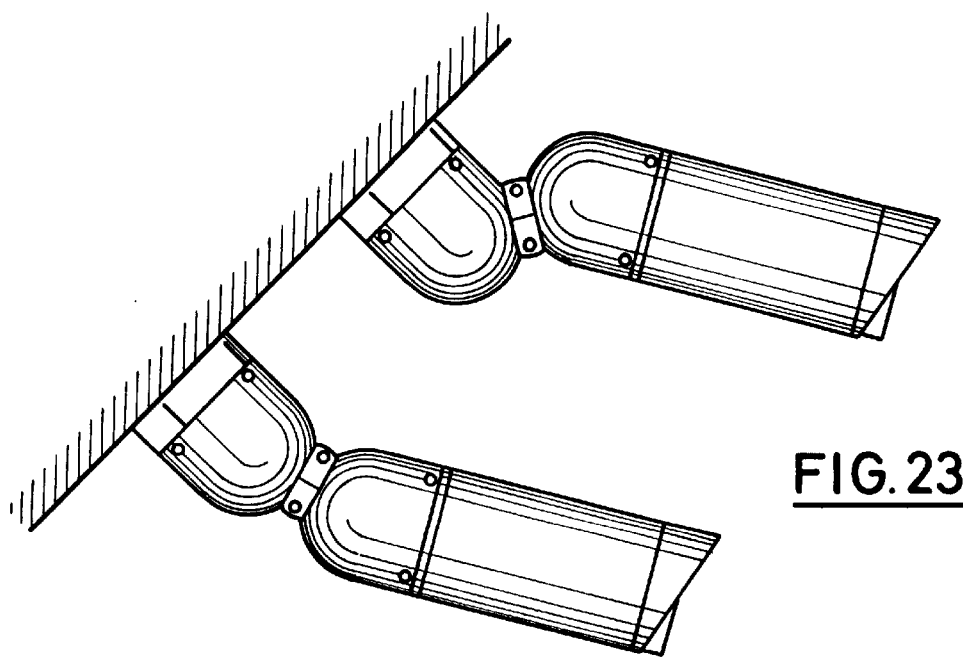
Figure 23F:
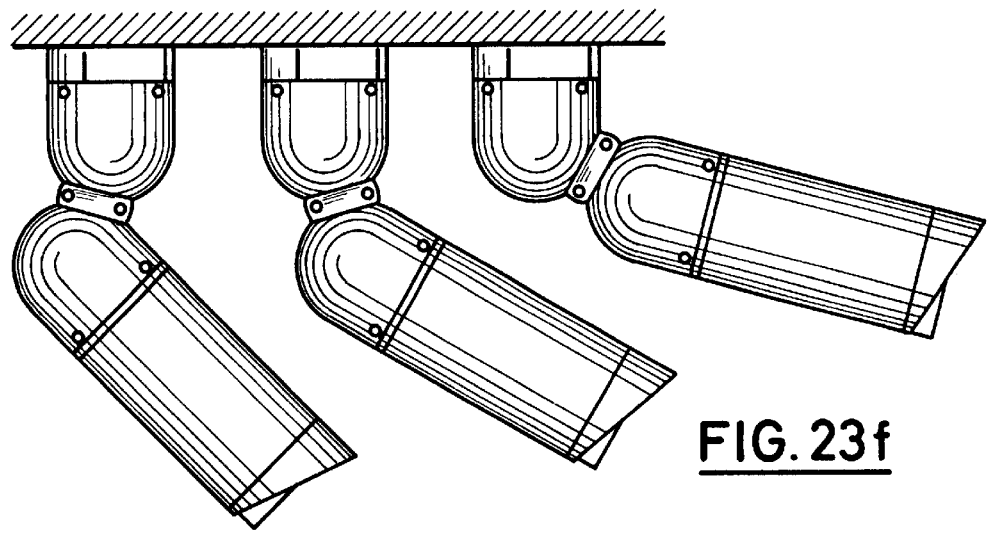
Figure 23G:
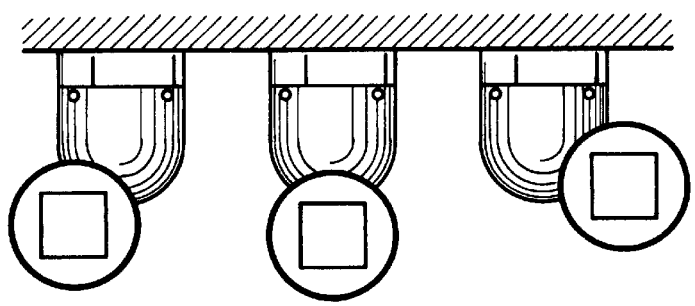
Figure 23H:
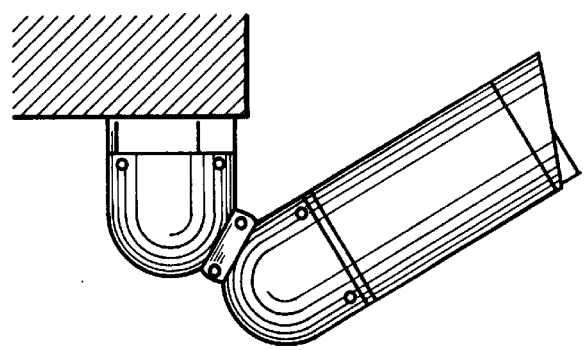
Figure 23I:
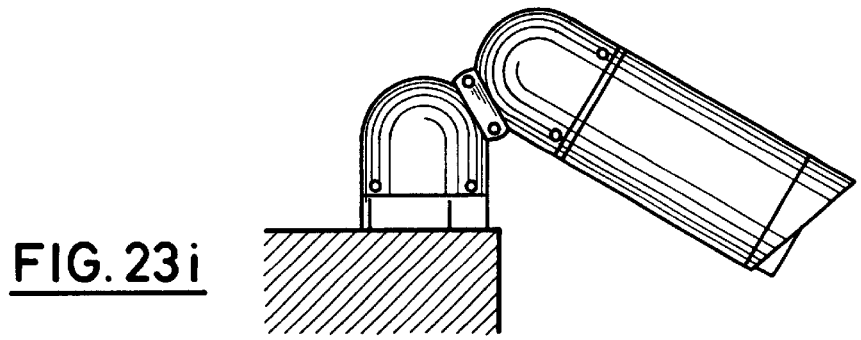
Figure 24:
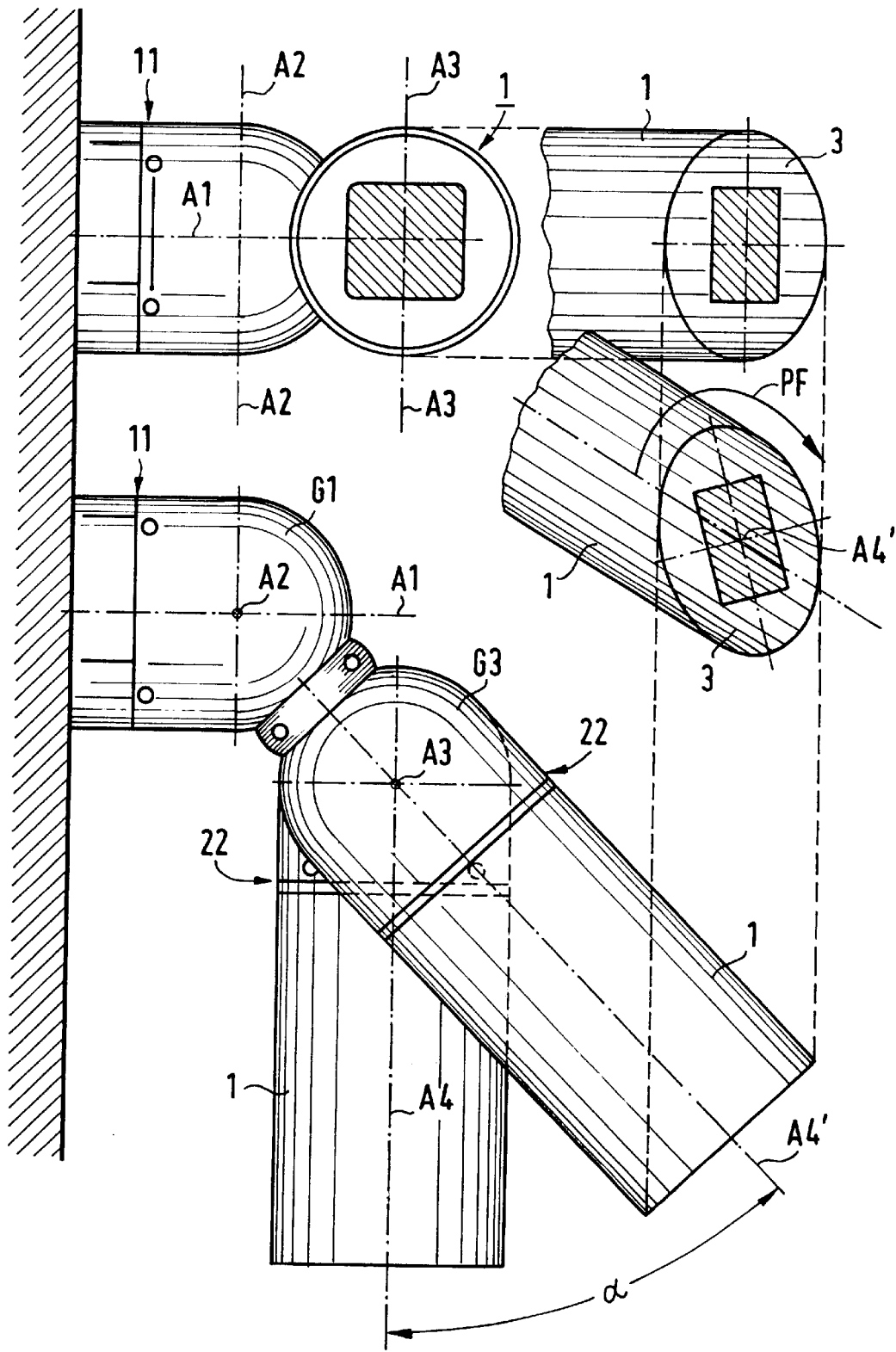

FIG. 23a in a wall mounting with optical axes aligned horizontally,

FIG. 23b in a wall mounting with optical axes aligned upwardly at an angle,

FIG. 23c in a wall mounting with optical axes aligned parallel to the wall,

FIG. 23d in a wall mounting with optical axes aligned downwardly at an angle,

FIG. 23e in a mounting on a slanting inside surface of a ceiling or roof,

FIG. 23f in a mounting under a horizontal ceiling with optical axes slanting downward, FIG. 23g in a mounting under a horizontal ceiling with optical axes pointing at the observer and parallel to the ceiling, FIG. 23h in a mounting under a horizontal surface of a overhead beam pointing upward at an angle, FIG. 23i in a mounting on a horizontal surface of a flat roof or cornice pointing downward, and FIG. 24 is a modification of FIG. 23c, again on an enlarged scale to explain the elimination of tilting the video image by a second rotary receptacle.

In FIGS. 1 to 7 and 10 to 12 is shown a protective housing 1, which consists preferably of a section of extruded aluminum or of a section of a plastic tube, the cross section being of almost any desired shape, e.g., circular, polygonal, or even with flat side walls, downwardly curving bottom and upwardly curved roof. Such a protective housing can also be shaped with a so-called visor. At the ends the protective housing terminates in a back wall 2 and a window wall 3. On the back wall 2 a supporting track 4 is fastened, which extends to a point near the window wall 3, and at its front end it bears an optical apparatus 5 in the form of a video camera 6 with a lens 7. In this manner an optical axis AO is defined. On the supporting track there is furthermore an electronic unit 8, which here is only of secondary interest.

A mounting system 9 extends from the middle of the back wall 2 and terminates in a mounting body 10 which has a contact surface FA for placement on a mounting surface F, which in this case is a vertical wall surface. The mounting body 10 has a lockable rotary receptacle 11 which will be further explained in conjunction with FIG. 8.

The mounting body 10 with its rotary receptacle 11 defines a first pivot axis Al running perpendicular to the contact surface FA, as can be seen in FIGS. 1 and 2. The first pivot axis A1 is concentric with a first link G1, which in the present case is a square tube and is held by the rotary receptacle 11. On the end remote from the rotary receptacle 11, the link G1 is provided with a second pivot axis A2 at which a second link G2 is attached by means of two set screws 12, which also consists of a square tube on the greatest part of its length. As shown in FIGS. 1 and 2, the link G2 is cut away on two opposite sides at the pivot axis A2, so that the links G1 and G2 can move freely about the pivot axis A2 but can be locked up.

The end of the second link G2 remote from the second pivot axis A2 bears the third pivot axis A3 which is formed by set screws 13. The two pivot axes A2 and A3 are perpendicular to one another and to the first pivot axis A1, resulting in a kind of spaced-apart Cardan joint. By means of nuts provided 90° apart, the set screws 13 and 13a are alternatively reversible by 90°, so that the pivot axes A2 and A3 can also be parallel to one another if the link G3 is rotated accordingly.

From the back wall 2 a third link G3 extends in the direction of the mounting body 10 and is likewise configured as a square tube which is notched on opposite sides at the pivot axis A3, resulting in a sufficiently great rotational angle. The third link G3 is affixed to the back wall 2.

When all of the links G1, G2 and G3 are in the outstretched state, as represented in FIGS. 1 and 2, a rectilinear cable tunnel is produced inside of the links, in which a connecting cable can be placed, which is inserted in a known manner through a cable entrance 14 into the interior of the housing 1. For the sake of clarity the course of the cable is not shown.

As it can furthermore be seen in FIGS. 1 and 2, the links G1, G2 and G3 are surrounded in the entire length between the back wall 2 and the mounting body 10 by a bellows 15 which for reasons of assembly is releasably attached to the back wall 2 and the mounting body 10. In the loose state the bellows 15 is contracted to a fraction of its length so that it does not interfere with assembly and with the orientation of the housing 1.

It can be seen from FIGS. 1 and 2 that the protective housing 1 can be rotated about the horizontal pivot axis A3 in a vertical plane and about pivot axis A2 in a horizontal plane, by angles that are virtually unlimited. After the optical axis AO has been set in the desired position, the set screws 12 and 13 are tightened so that the protective housing 1 is held in a virtually vibration-proof manner. Due to the separation of the pivot axes A2 and A3, the installed cable is prevented from being bent on a short length which markedly shortens the life of the cable in the case of frequent readjustment. By the same measure the life of the bellows 15 is lengthened.

Movement about the pivot axes A2 and A3 assures that the video camera 6 will not be rotated about the optical axis A); in the case of wall mounting rotation about the first pivot axis A1 is unnecessary. The pivot axis A1, however, is given considerable importance when the mounting surface F is a ceiling, for example; this will be discussed further below.

Figures 3, 4:
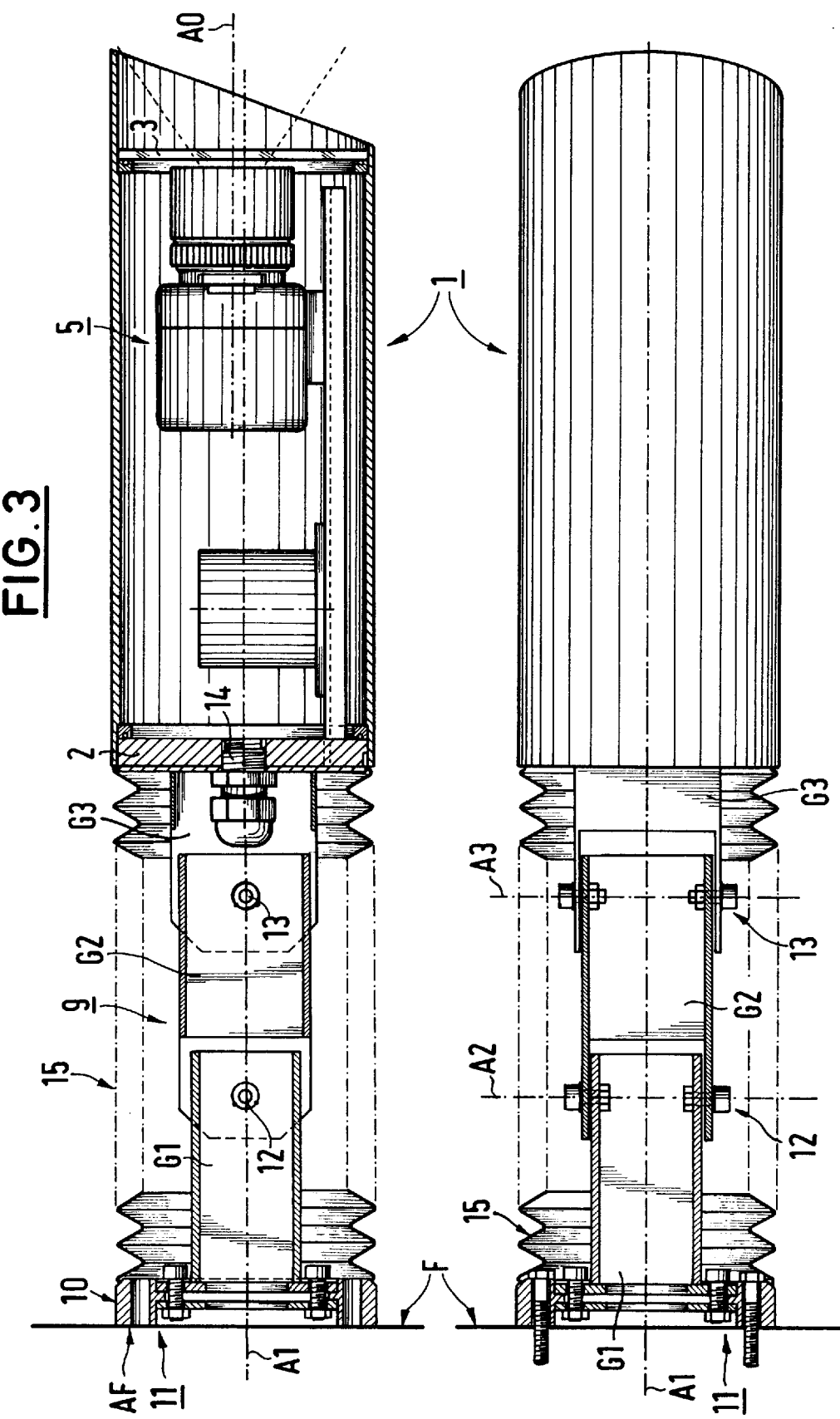
FIG. 3 is a vertical section similar to FIG. 1 with a second embodiment of a mounting system.
FIG. 4 is a partial horizontal section and partial plan view of the subject of FIG. 3.

In the second embodiment in FIGS. 3 and 4 the second and the third pivot axes A2 and A3 are parallel to one another, but again perpendicular to the first pivot axis A1. This results in the possibility of a great angle of movement of the protective housing 1 with only a slight local curvature of the cable tunnel and bellows 15, which will be further explained below in connection with FIGS. 6 and 7.

Figure 5:
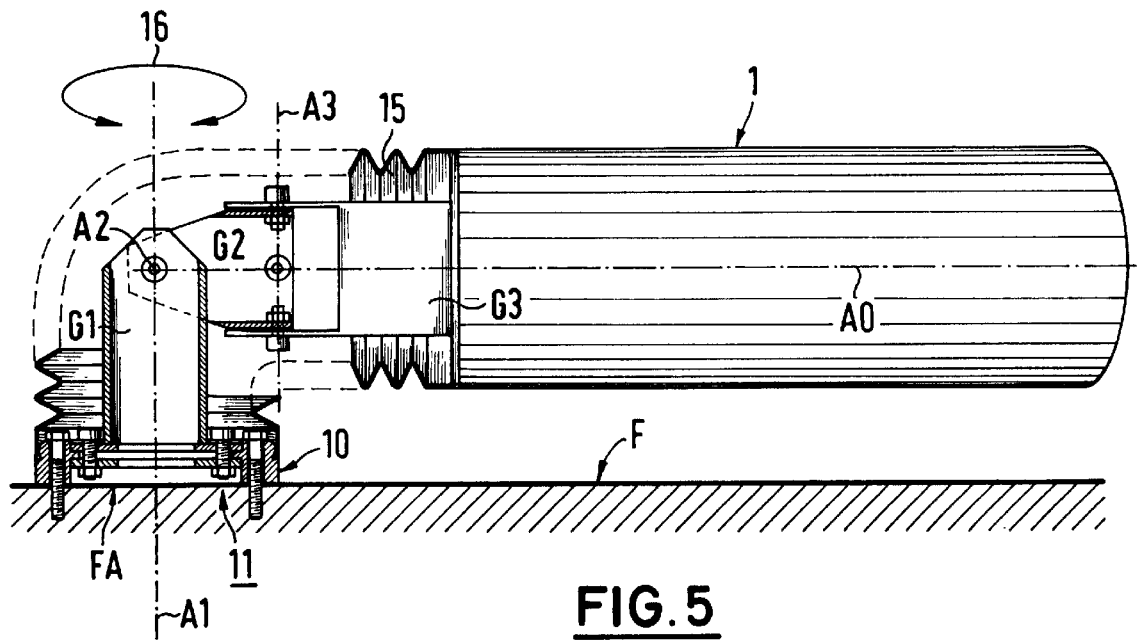
FIG. 5 shows the subject of FIGS. 1 and 2 when it is mounted on a vertical surface after the optical axis has been aligned parallel to the mounting surface.

FIG. 5 shows how the subject of FIGS. 1 and 2 can be mounted on a surface F which is likewise a vertical wall surface. Inasmuch as in this case the optical axis AO is turned 90° about the second pivot axis A2 and is then parallel to the mounting surface F, the optical axis AO can be swung in a plane parallel to the mounting surface F, as indicated by the double arrow 16. In such a case the third pivot axis A3 can be eliminated, resulting in an extremely short length of the mounting system 9 with a great pivoting angle. The third pivot A3, however, creates the possibility, if the axis A2 is perpendicular, of turning the optical axis AO with respect to the surface F in any desired manner, and nevertheless to tilt it without tilting the image of a video camera.

Figure 6:
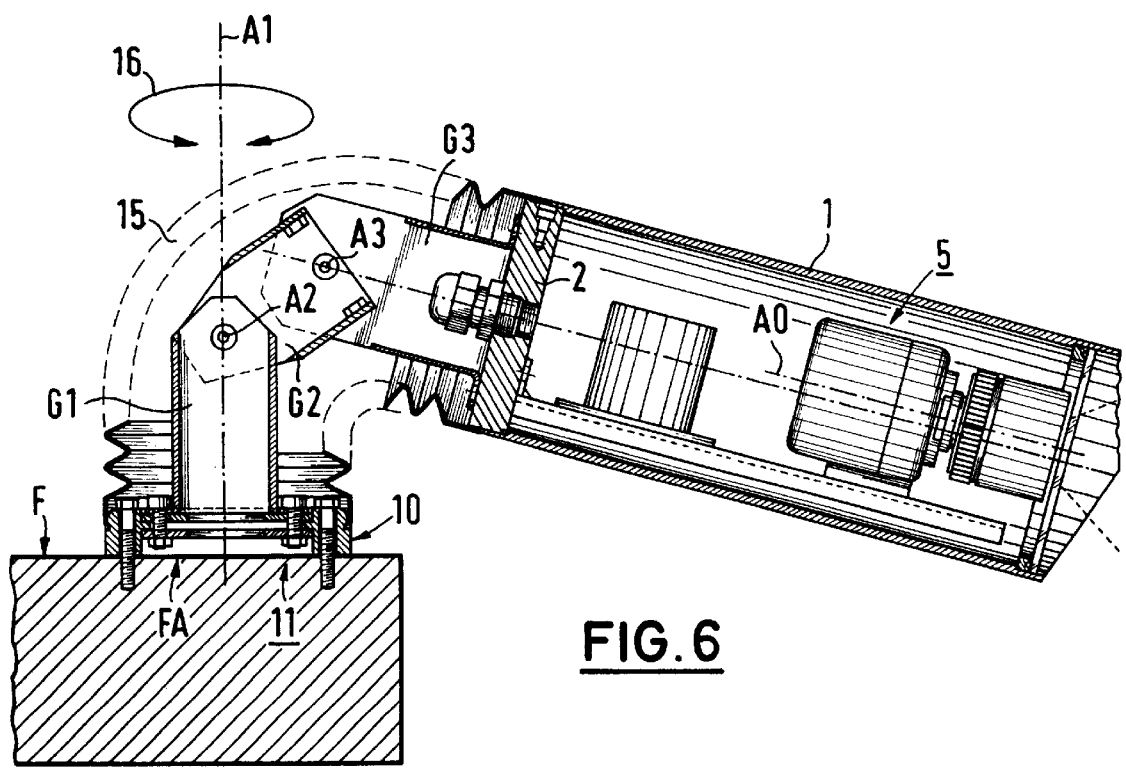
FIG. 6 shows a subject similar to FIGS. 3 and 4 in the case of an installation on a horizontal surface after the optical axis has been aligned more than 90° downward.
Figure 7:
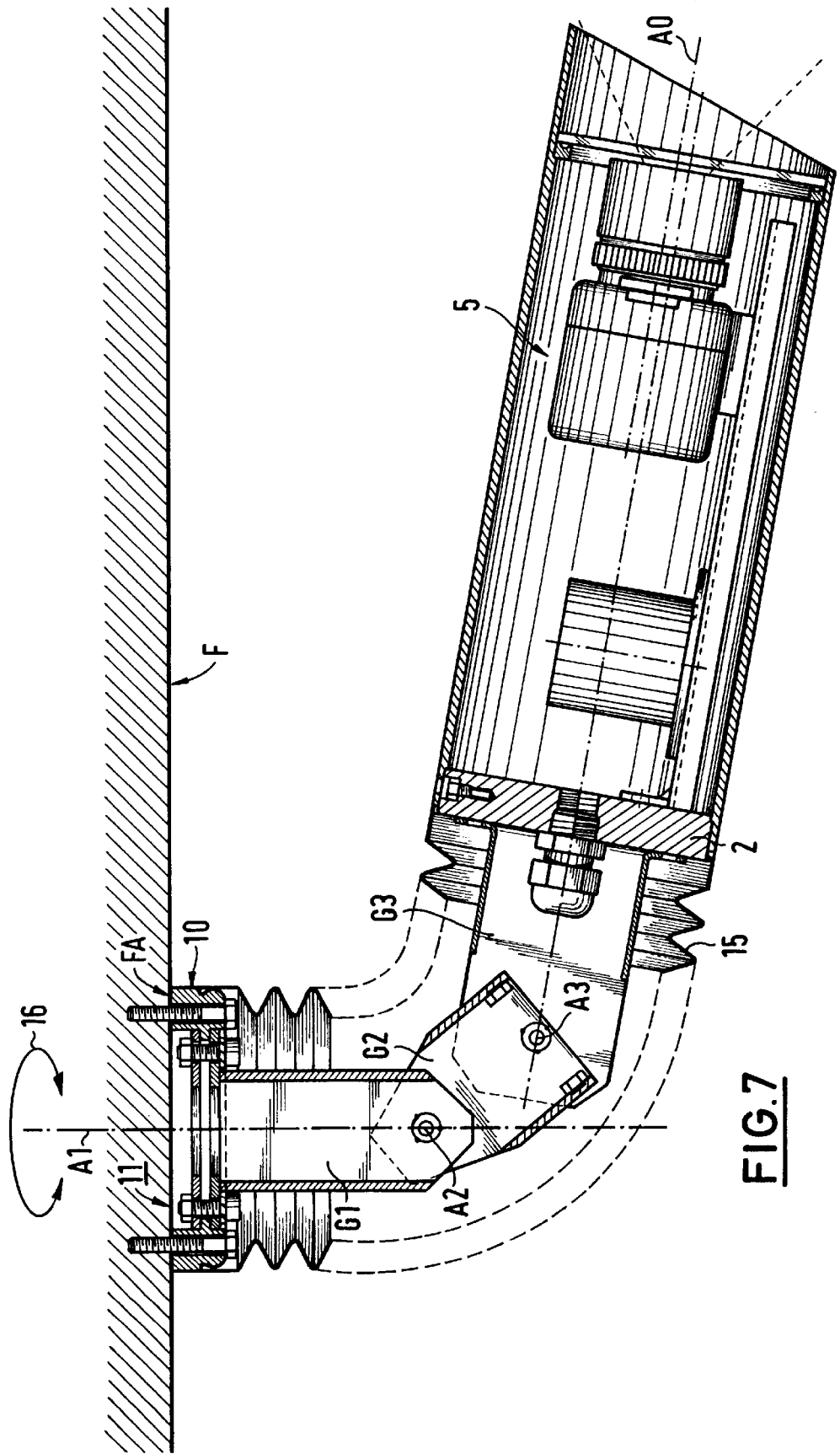
FIG. 7 shows the subject of FIG. 6 installed under a horizontal surface after the optical axis is aligned less than 90° downward.

FIGS. 6 and 7 show possibilities for which especially the embodiments of FIGS. 3 and 4 as well as 10 and 11 are qualified. In the case represented in FIG. 6 the mounting body 10 is mounted with screws on a mounting surface F, which can be, for example, a roof or the horizontal upper side of a beam. From this point the protective housing 1 with the optical axis AO can be moved away from the direction of the first pivot axis A1 by definitely more than 90° to the indicated position. To be able in this case to rotate the optical axis AO in all of the necessary space coordinates, the rotary receptacle 11 is loosened and the entire system is rotated on the first pivot axis A1, which is perpendicular in this case, so that the optical axis AO can attain all of the necessary space coordinates without tilting the image.

The opposite arrangement is shown in FIG. 7. In this case the mounting body 10 is affixed to mounting surface F which is the underside of a ceiling, i.e., is horizontal. In this case too the protective housing 1 is rotated from a first position given by the first pivot axis A1, by less than 90° in this case. By turning it about the first pivot axis A1, which in this case is perpendicular to the contact surface FA, the optical axis AO can attain all of the necessary space coordinates without tilting the image.

Figure 8:
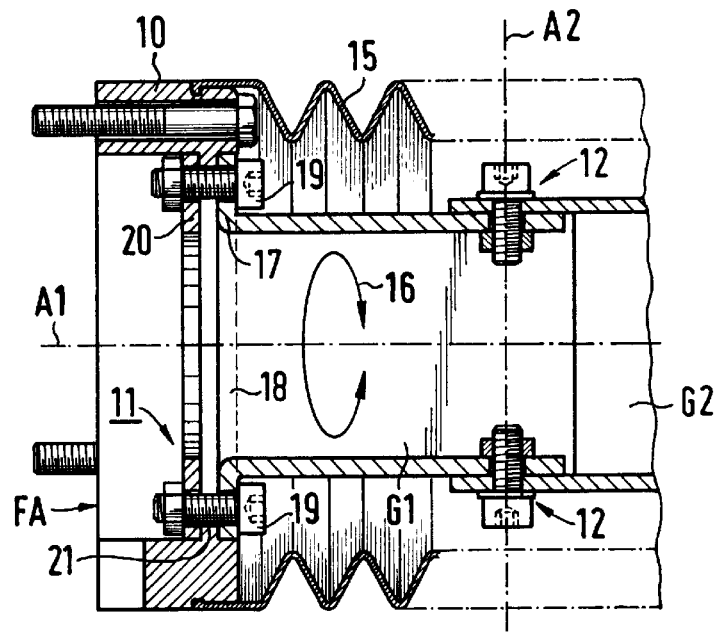
FIG. 8 shows the left end of FIG. 1 on a larger scale.
Figure 9:
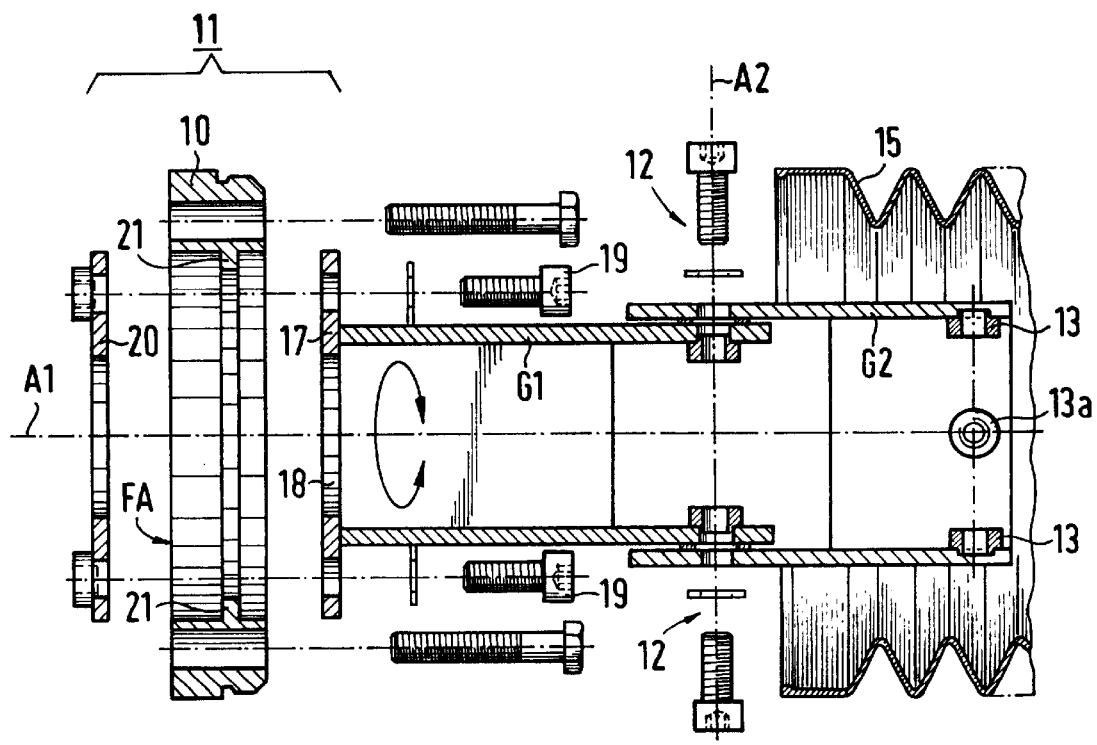
FIG. 9 is an exploded view of the subject of FIG. 8.
Figure 10:
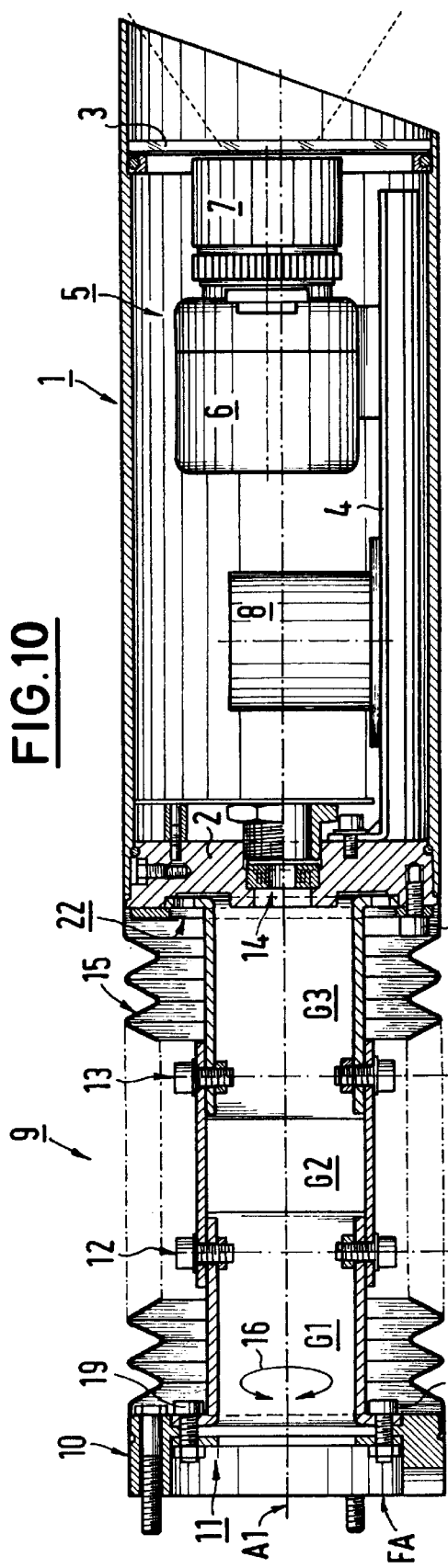
FIG. 10 shows a subject similar to FIG. 1, but with an additional rotary receptacle on the back wall of the protective housing.

In FIGS. 8 and 9 parts that are the same as before are given the same reference numbers.

The first link G1 is fastened on a rotatable flange plate 17 which is in the form of a ring and has a central opening 18 to accommodate a cable. The flange plate 17 is fastened by a circle of bolts 19 to a congruent plate 20. Flange plate 17 and congruent plate 20 clamp between them a radial annular flange 21 which is part of the mounting body 10. Parts 17, 20 and 21 form the previously described rotary receptacle 11 which is locked up and released by the bolts 19. Thus the mounting system 9, and with it the protective housing 1 can be steplessly adjusted and locked up with respect to the first pivot axis A1.

The protective housing 1 in FIGS. 10 to 13 has an additional pivot axis A4 for the rotation of the housing 1 with respect to the mounting body and the links G1, G2 and G3. The pivot axis A4 passes virtually through the back wall 2 and runs parallel to the optical axis AO.

Figure 11:
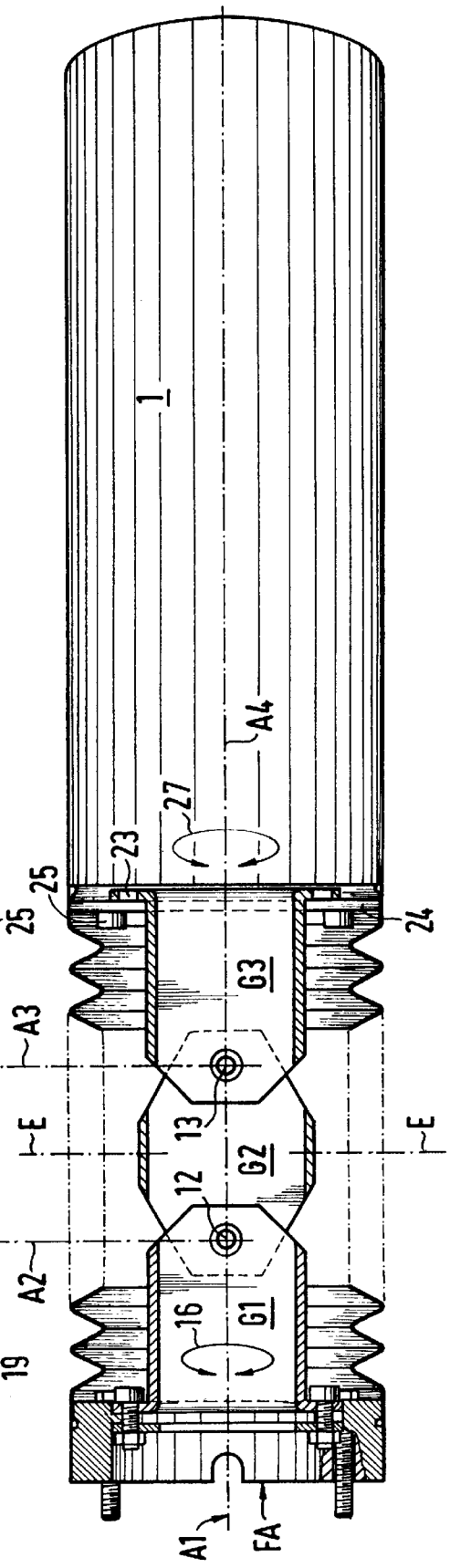
FIG. 11 is a top view of the subject of FIG. 10.

For this purpose the back wall 2 of the protective housing 1 has an additional lockable rotary receptacle 22 into which reaches an additional, rotatable annular flange 23 of the last link G3, which at least partially encompasses the last pivot axis A4. The pivot axes A2 and A3 are parallel to one another and are perpendicular in space, so that the optical axis AO can at first be turned horizontally in space. The arrangement is in mirror-image symmetry with a plane E-E, as shown in FIG. 11, so that the rotary receptacles 11 and 22 and the links G1 and G2 are at least mostly made up of the same components.

Figure 12:
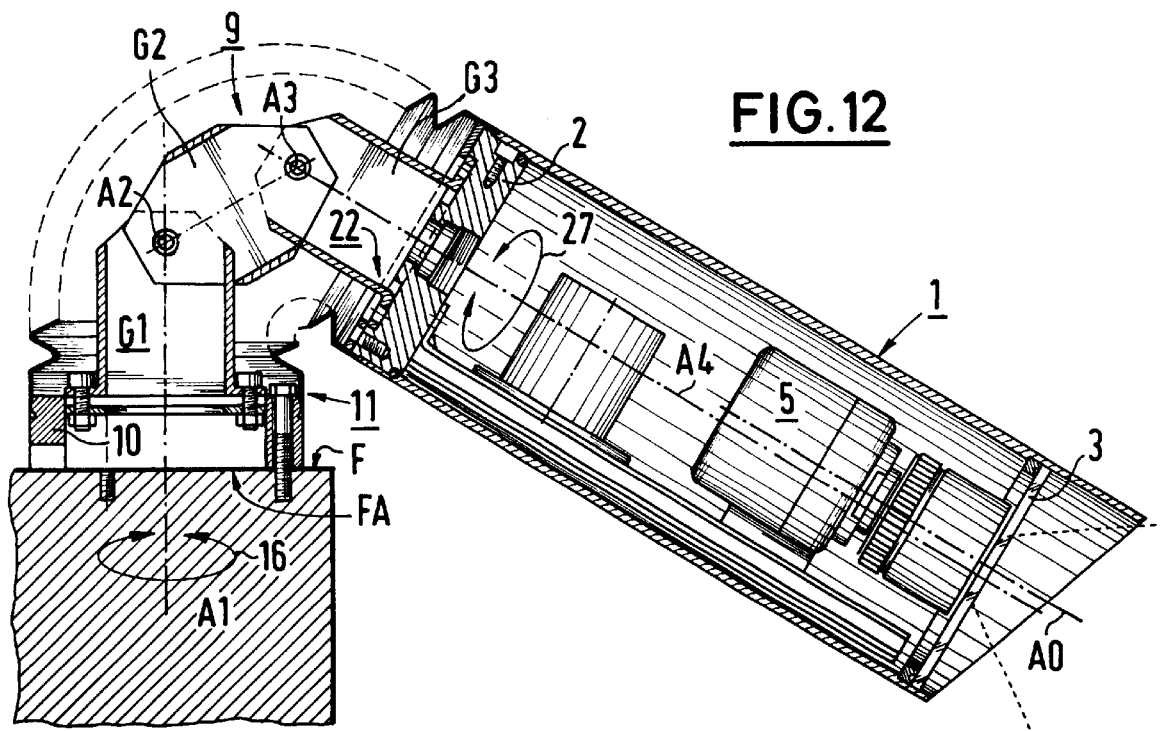
FIG. 12 shows the subject of FIGS. 10 and 11 in a manner similar to FIG. 6.

The pivot axes A2 and A3 can now be adjusted by means of the rotary receptacles 11 and 22 by 90° around the pivot axes A1 and A4, thereby coming into the horizontal position seen in FIG. 12, so that the protective housing can be adjusted relative to a horizontal mounting surface F (e.g., a ceiling). At the same time a long bending radius is achieved for the bellows 15, as shown especially in FIG. 12.

Figure 13:
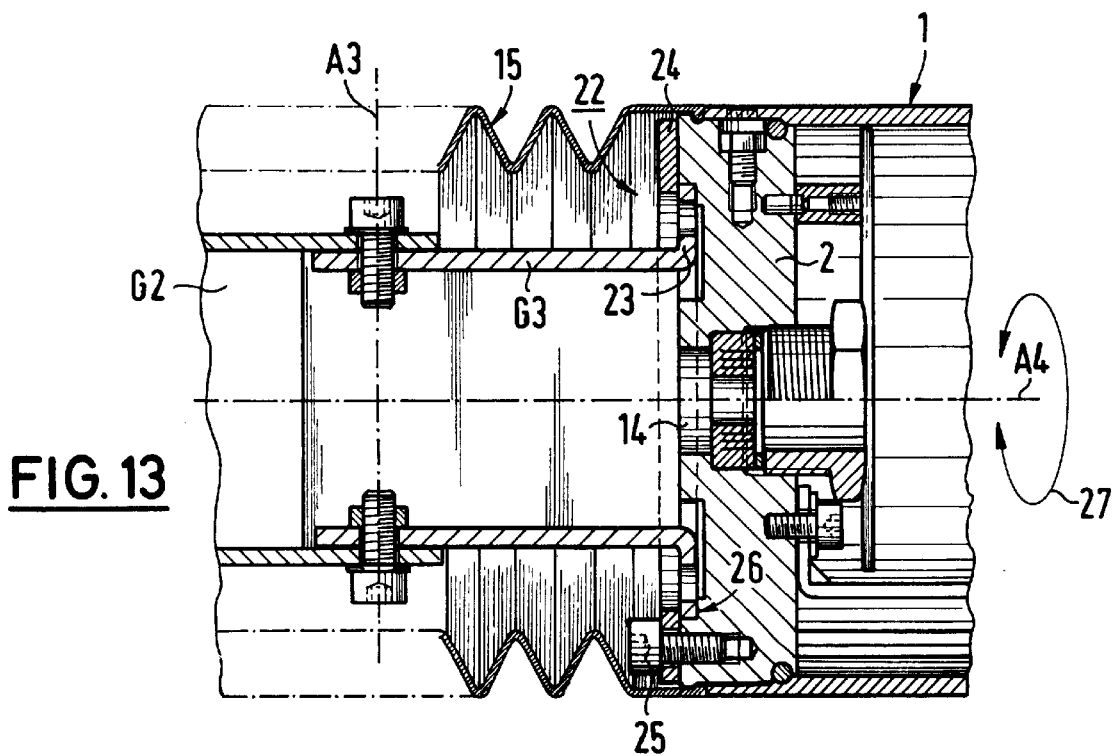
FIG. 13 is an enlarged section of the second rotary receptacle on the back wall.

FIG. 13 also shows that a recess is provided in the back wall 2 and has a shoulder surface 26 against which the flange 23 can be urged by the counter plate 24 and the screws 25 and thus locked up.

In the embodiments of FIGS. 3, 4, 6 7, 10, 11 and 12, the two parallel pivot axes A2 and A3 can also be replaced by a single pivot axis which, when the mounting body 10 is fastened to a horizontal surface, would be entirely sufficient to permit coverage of all space coordinates. Only the curvature of the cable would thus be sharpened. In the case of mounting on surfaces not horizontal, however, in many cases the picture edges would be tilted, as pointed out further above. Now, here the second rotary receptacle 22 between the last link and the housing 1 offers a remedy, as will be explained by way of example with the aid of FIGS. 10 and 13. Of course, the back wall 2 in FIGS. 1 to 7 and 12 can be equipped or combined with such a rotary receptacle 22 or with a rotary receptacle 11 according to FIGS. 8 and 9, so that in all cases a universal apparatus is obtained. The effect will be explained in greater detail below in conjunction with FIG. 24.

In FIG. 14—in conjunction with the third embodiment—a mounting surface F is shown to which the contact surface FA of a mounting body 10 is screwed. With the latter a first link G1 forms when assembled a first rotary receptacle 11. The link G1 has a partially spherical shell S1 and will be further explained in reference to FIGS. 17 to 20.

A thrust body D1 has an outer rotation surface R1 and a bore 30 which is surrounded by a collar 31, and in the assembled state it is inside of the link G1, the radii of curvature of the surfaces in contact being the same.

At the opposite end of the axis A—A there is shown the end of a protective housing 1 into which a back wall 2 is inserted. Above that—in a mirror-image arrangement symmetrical with the link G1—is shown a third link G3 which is equal in configuration to link G1 and has a partially spherical shell S3. In the assembled state the link G3 forms an additional lockable rotary receptacle 22. An additional thrust body D3 with a rotation surface R3 is identical in form to the thrust body D1. The thrust bodies D1 and D3 are of a horseshoe shape, as is also apparent in FIG. 19. The rotation surfaces R1 and R3 are thus in a way sections of a sphere of partial circumference.

In the assembled state a second link G2 is passed through the bores 30; it is in the form of a rectilinear hollow body and is held against traction by lock rings 32. Its cross section can be hollow-cylindrical, but it can also be a tube of rectangular cross section; in the drawing it is shown as a short pipe section. If a rectangular tube is used the bore 30 must have a complementary cross section, thereby losing one degree of freedom of movement (rotation with respect to the thrust bodies D1 and D2), but this is compensated by the rotary receptacles 11 and/or 22.

Between the partially spherical shells S1 and S3 there is a clamp component 33 in the form of an axially divided thrust disk consisting of two half rings of which only one is represented in FIGS. 15 and 16. A dividing seam TF (FIG. 16) forms a radial gap which permits the two half rings 34 to be drawn radially against the link G2. The screws 35 required for this purpose are indicated by arrows. The half rings 34 have in mirror-image symmetry the concave contact surfaces 36 which are adapted—at least at the outer margin of the thrust disk—to the external shape of the partially spherical shells S1 and S2. In the area 36a lying further in, the surfaces are slightly set back.

The thrust bodies D1 and D3 can thus be clamped against the partially spherical shells S1 and S3 and against the thrust disk. On account of the relatively great diameter and the wedging action of the half rings 34, considerable clamping forces can be produced which after adjustment fix the links G1, G2 and G3 forcefully and reliably against one another. The conditions can be further improved by a friction coating or roughening.

By means of FIGS. 17 to 20 it is shown that the partially spherical shells S1 and S3 have external surfaces S1A and S3A which in the assembled state are directed against one another, as well as inside surfaces S11 and S31 concentric therewith, against which lie the thrust bodies D1 and D3. In each of the partially spherical shells S1 and S3 there is a slot-like opening defined by parallel edges 38, the center line ML of which extends on a large circle approximately from the axis to the edge of the partially spherical shells S1 and S3. In these openings the collars 31 with the middle link G3 can be turned correspondingly far about the center points M1 and M3 of the partially spherical shells. To prevent the thrust bodies D1 and D3 from turning on the axes of the bores 30 with respect to the links G1 and G3, ribs 39 are provided on the inside surfaces S11 and S31, which run parallel to the edges 38. The distance between the ribs 39 corresponds to the width B of the thrust bodies D1 and D3, which can be seen by viewing FIGS. 19 and 20 together.

As a result, the rotation surfaces R1 and R3 and the inside surfaces S11 and S31 can likewise be configured as partially spherical surfaces, which promotes the rigidity of the thrust bodies. The rotation surfaces R1 and R and the inner surfaces S11 and S31 can be in the shape of cylindrical or truncoconical surfaces between the ribs 39. In any case, however, the thrust bodies D1 and D3 at least partially overlap the circumferential margin of the openings 37 in order to assure sufficient mechanical support. But complete lockable in any relative position is to be preferred.

Thus even the bellows 15 shown in FIGS. 1 to 13 is unnecessary. A fully encapsulated mounting system with extremely smooth surfaces results, both as protection against sabotage and against weathering.

Figure 17:
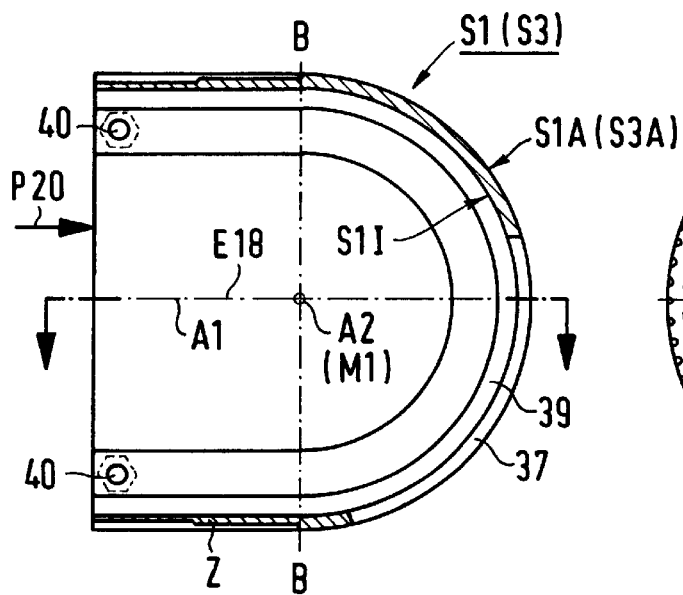
FIG. 17 is an axial section through one of the links with a partially spherical shell as seen parallel to the second and third pivot axis along the plane E17 in FIG. 18.
Figure 18:
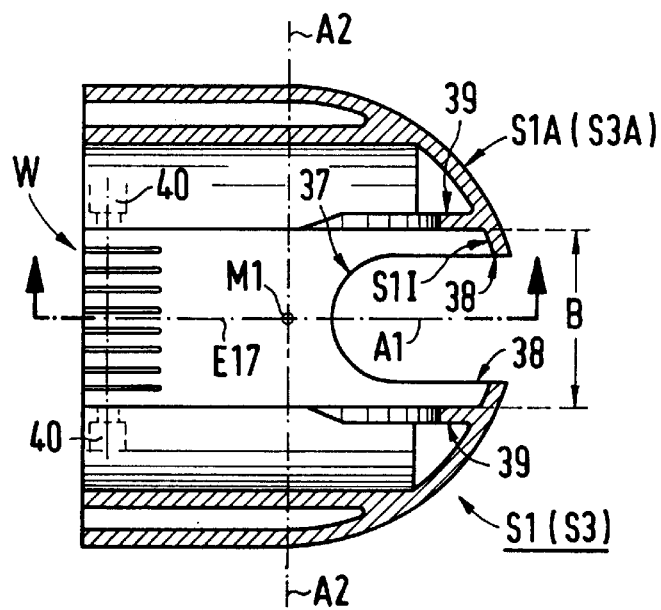
FIG. 18 is an axial section through the subject of FIG. 17, along the plane E18 in FIG. 17 and along the first and second pivot axes crossing at right angles.
Figure 20:
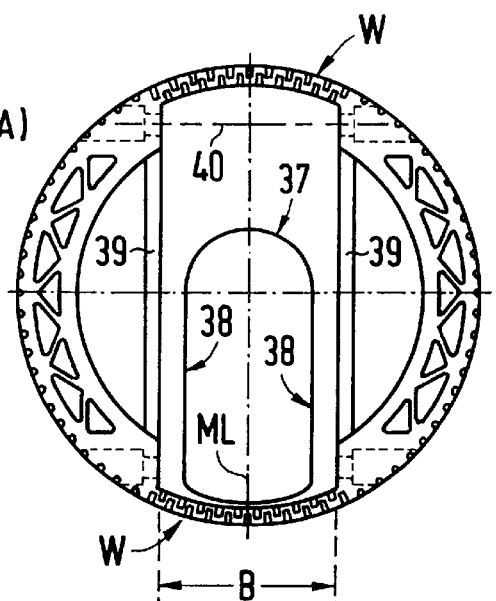
FIG. 20 is a view of the subject of FIG. 17 in the direction of arrow P20 in FIG. 17.
Figure 19:
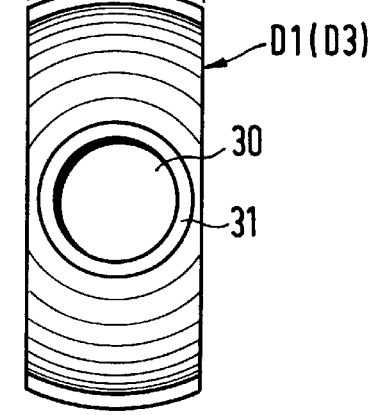
FIG. 19 is a rear view of a clamp body disposed inside of the partially spherical shells, in the direction of the axis A—A in FIG. 14.

As it can furthermore be seen in FIGS. 17 and 18, each of the partially spherical surfaces S1 and S3 comes in contact with a base surface B—B which passes through the center point M1 and M3, respectively and which is defined by the diameter. The one end of the slot-like opening 37 reaches nearly to this base surface. The partially spherical shells S1 and S3 are prolonged by a hollow cylindrical section Z, starting from this base surface B—B, which then is engaged in the particular rotary receptacles 11 and 12, respectively. For the purpose of setting or lockable, the end of section Z is made elastic and clampable, namely either by slotting or—as shown—by a wavy shape W at two diametrically opposite points of the circumference. Bores 40 serve for the insertion of clamping screws not shown.

Figure 21:
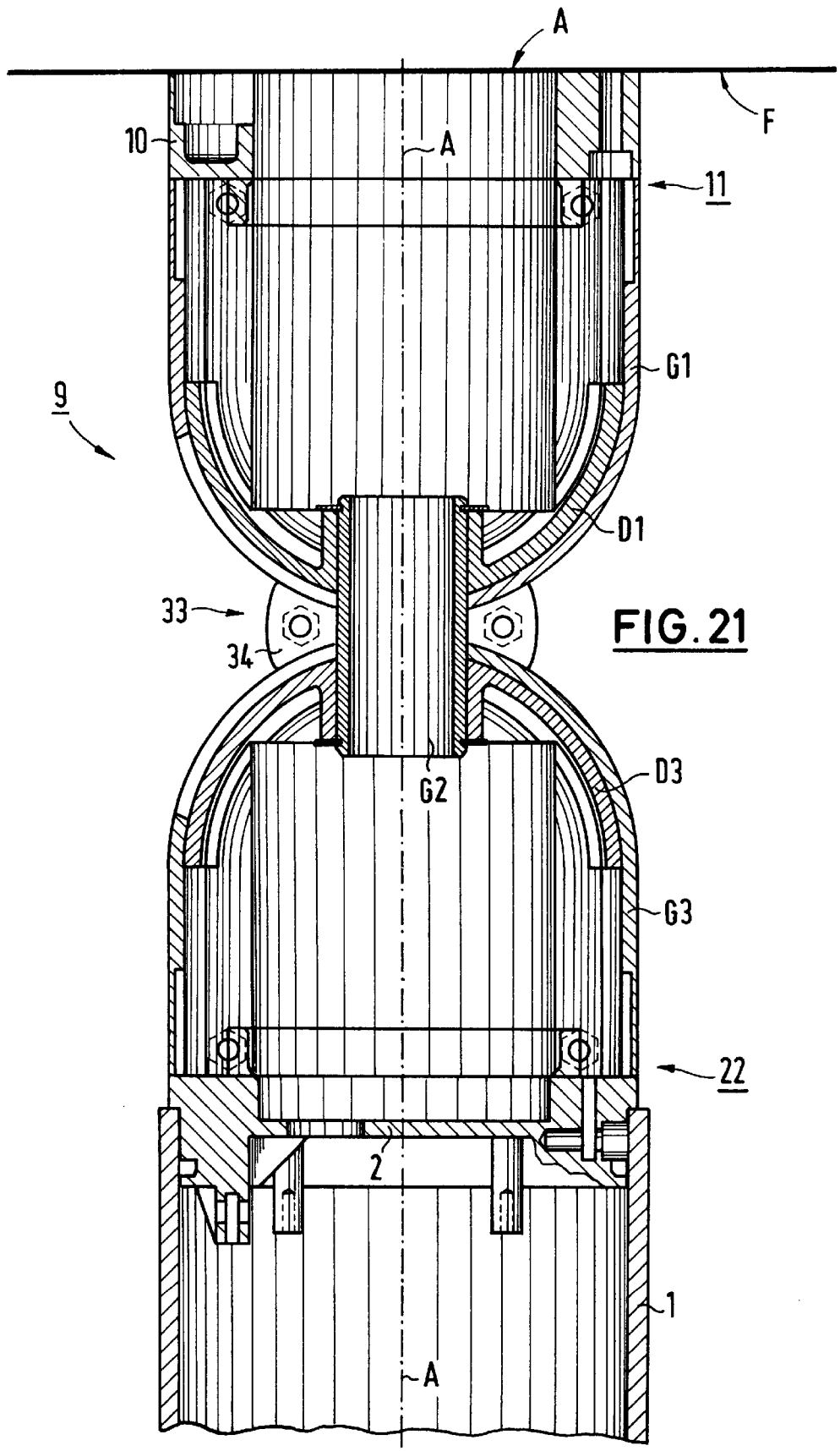
FIG. 21 shows the subject of FIG. 14 mounted in the straight condition.

FIG. 21 shows the entire mounting system 9 in the outstretched position. The second link G2 is in this case abutted against the axis-related ends of the two openings 37. In this position, cables, not shown, for supplying power to the electronics, heating the face plate and for transmitting the television signals can be inserted from the mounting surface F to the back wall along the axis A—A.

Figure 22:
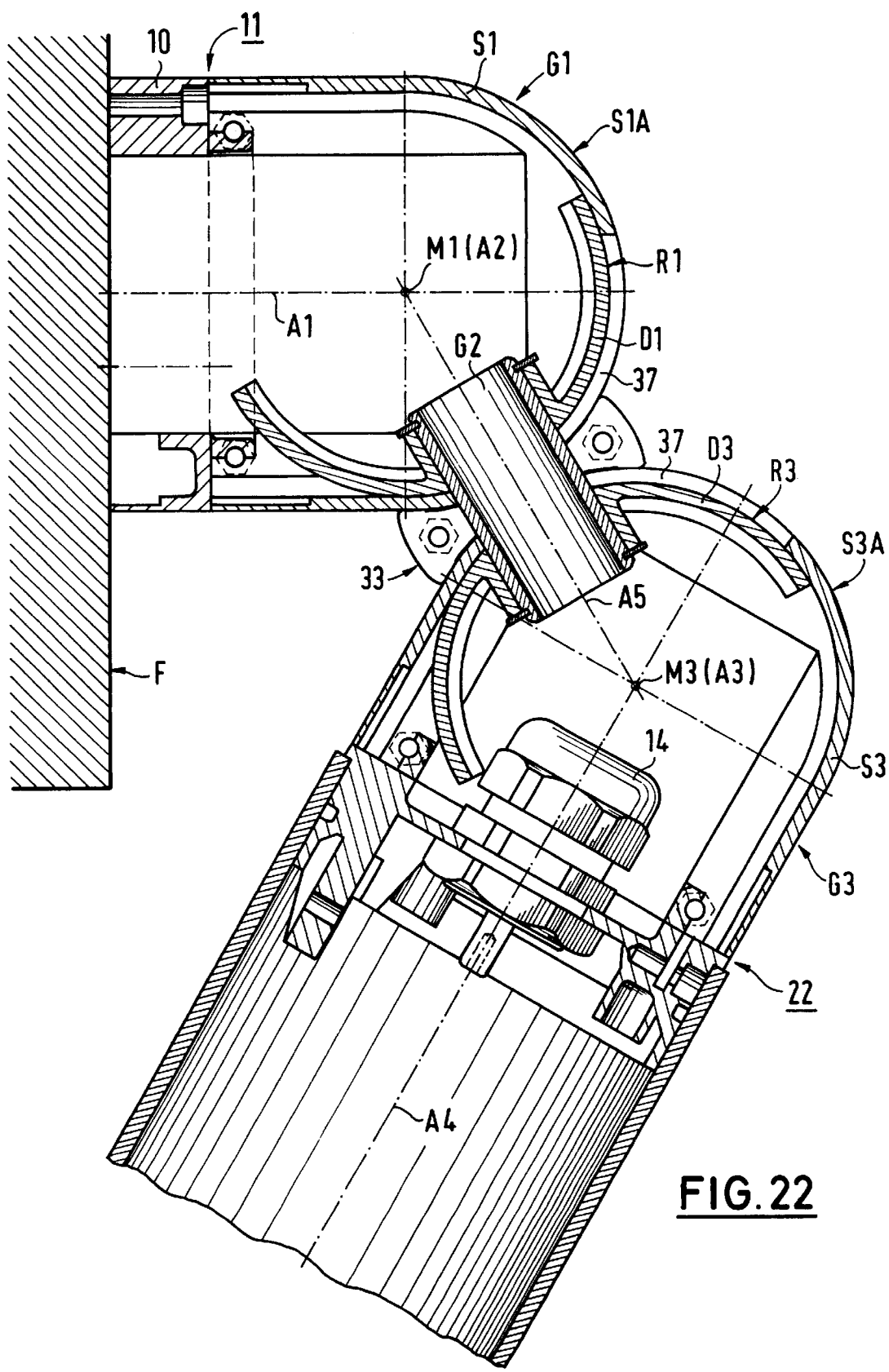
FIG. 22 shows the subject of FIG. 21 in one of the possible altered positions.

FIG. 22 shows the entire system attached to a vertical mounting surface F (wall surface), after it has been set to an extreme position in which the angle from the outstretched position in FIG. 1 amounts to 120°. Here the second link G2 encounters the ends of the two openings 37 that are remote from the axis. The cables, not shown, can in this case be well rounded as far as the point of their insertion 14, i.e., they are not sharply bent.

The pivot axes A1, A2, A3 and A4 are not physical axes but mathematical axes. The first pivot axis A1 is formed by the rotary receptacle 11. The second and third pivot axes A2 and A3 are perpendicular to the plane of drawing and are defined by the predetermined degree of rotation of the second link G2 in the partially spherical shells S1 and S3 along the two center lines ML of the openings 37, which are parallel to or in the plane of the drawing.

If the second link G2 is a round tube, the two links G1 and G3 can be swung additionally about the pivot axis A5 which runs through the center points M1 and M3 of the partially spherical shells S1 and S3. By the combined action of the pivot axes A1, A2, A3 and A5 the optical axis of a video camera can reach virtually any place in space in front of the surface F.

If the second link G2 is a square tube, rotation about the axis A5 is not possible. This is compensated by the action of the second rotary receptacle 22 so that the same effect is achieved by the combined action of axes A1, A2, A3 and A4.

In both the cases described above, any tilting of the window frame or the picture in the camera can be compensated in the installation and adjustment, and, of course at a later time if the protective housing has to be reoriented, so that an image with horizontal and vertical margins always appears on the monitor.

FIGS. 23a to 23i show, on a greatly reduced scale, the protective housing in different possible settings, namely:

FIG. 23a a wall mounting with horizontal optical axes, FIG. 23b a wall mounting with optical axes tilted upward at an angle, FIG. 23c a wall mounting with optical axes aligned parallel to the wall, FIG. 23d a wall mounting with optical axes slanting downward, FIG. 23e a mounting on the inside of a sloping ceiling or roof, FIG. 23f a mounting underneath a horizontal ceiling with optical axes slanting downward, FIG. 23g a mounting underneath a horizontal ceiling with optical axis aimed at the observer and aligned parallel to the ceiling surface, FIG. 23h a mounting underneath a horizontal surface of an overhead beam, pointing upward at an angle, and FIG. 23i a mounting on a horizontal surface of a flat roof or cornice and pointing upward at an angle.

FIG. 24 shows a modification of FIG. 23c on an enlarged scale to explain the correction of a tilted video image by the second rotary receptacle 22 and, above, a side view with a horizontal aim and below a plan view with a vertical aim. The window in the window wall 3 is shown hatched.

The axis A1 is always horizontal. Axes A2 and A3 are at first perpendicular and axis A4 again horizontal. If now for example the protective housing 1 is turned around the vertical axis A3 by the angle α, the axis A4 moves in a horizontal plane (top and bottom). The edges of the image in this case remain horizontal and vertical.

In order to tilt the axis A4, the entire system is swung by the first rotary receptacle 11 about the axis A1, and the axes A2 and A3 turn with it. The camera window thus becomes tilted, as shown in the middle. This tilt is corrected by rotating the protective housing 1 by means of the second rotary receptacle 22 with respect to the third link G3 around the axis A4 in the direction of the arrow PF, so that the video image again becomes "upright." This possibility is likewise necessary in motion detectors, but not in floodlights. The comparison shows, however, that the subject of the invention is a universal apparatus which can be used both for video cameras and for other optical apparatus without the need for special replacement or conversion parts.

FIG. 23g shows especially to what degree the tilt of the picture axes or edges can be prevented by the second rotary receptacle 22. Such correction is impossible with the mountings of the state of the art.

What is claimed is:

1. A protective housing comprising:
   a back wall having a cable entrance;
   a window wall for an optical apparatus with an optical axis;
   the protective housing also comprising, for the orientation of said optical axis, a mounting system with at least first, second and third lockable links, said mounting system comprising pivot axes and a mounting body; said mounting body comprising a lockable rotary receptacle with a first pivot axis and a contact surface for attachment to a mounting surface; wherein the first pivot axis of the rotary receptacle is aligned perpendicular to said contact surface; said mounting system having at least one additional pivot axis which is aligned perpendicular to said first pivot axis, wherein:
   a) between said back wall and said mounting body first, second and third links are disposed, said first link being connected through the rotary receptacle to the mounting body and said third link to the back wall;
   b) wherein at least two said additional pivot axes are disposed between said links, said additional pivot axes are aligned perpendicular to one another and to said first pivot axis of the rotary receptacle, one of said additional pivot axes being aligned horizontally in the assembled state of the protective housing, and the other additional pivot axis is aligned perpendicular;
   c) said links enclosing a cable tunnel which can be brought to the outstretched position and leads to the cable entrance in said back wall;
   d) wherein said first link and said third link have each a partially spherical shell whose outside surfaces are directed against one another and which have each an opening, said first pivot axis and said second pivot axis stand vertically one on the other and pass through the center point of the partially spherical shell of said first link, and said third pivot axis passes through the center of said partially spherical shell of said third link;
   e) said second link being configured as a rectilinear hollow body and passing through the openings for rotation about the centers of said partially spherical shells;
   f) the interior of said partially spherical shells thrust bodies having external rotation surfaces which at least partially cover over the openings and are joined in a tension-resistant manner to the two ends of said second link; and
   g) clamping means are provided by which said two thrust bodies together with the second link can be locked to said partially spherical shells against rotation and displacement.

2. The protective housing according to claim 1, wherein said first link is inserted by means of a rotary flange plate into the rotary receptacle and at least partially encompasses said first pivot axis.

3. The protective housing according to claim 1, wherein a middle link is disposed between said first link disposed on the rotary receptacle and third link.

4. The protective housing according to claim 1, wherein at least one of the links has a U-shaped cross section on at least a portion of its length.

5. The protective housing according to claim 1, wherein at least one of the links has a tubular cross section on at least a portion of its length.

6. The protective housing according to claim 1, wherein the links are housed in a bellows which is attached at its one end to the mounting body and at its other end to the back wall of the protective housing.

7. The protective housing according to claim 1, wherein the second and third pivot axis run parallel to one another through the centers of the two partially spherical shells.

8. The protective housing according to claim 1, wherein the clamping component is an axially divided thrust means having concave thrust surfaces fitted to the partially spherical shells, by the radial compression of which the partially spherical shells can be tightened against the two thrust bodies.

9. The protective housing according to claim 1, wherein the openings in the partially spherical shells are slot-like and defined by edges parallel to one another, whose distance apart corresponds to the external cross section of the second link, and that the openings extend at least between the axis and the margin of the partially spherical shells.

10. The protective housing according to claim 1, wherein the partially spherical shells are prolonged at their base by a hollow cylindrical section of the same diameter.

11. The protective housing according to claim 1, wherein the second link is configured as a hollow cylinder.

12. The protective housing according to claim 1, wherein the second link is configured as a rectangular tube.

13. The protective housing according to claim 1, wherein the partially spherical shell of the third link is connected to the protective housing by a rotary receptacle.

14. A protective housing comprising:
   a back wall provided with a cable entrance;
   a window wall for optical apparatus with an optical axis;
   a mounting system for the orientation of the optical axes, said mounting system comprising lockable links, pivot axes and a mounting body comprising a lockable rotary receptacle with a first pivot axis and a contact surface for attachment to a mounting surface;
   wherein
   said pivot axis of said rotary receptacle is aligned perpendicular to the contact surface;
   said mounting system comprising at least one additional pivot axis which is aligned perpendicular to said first pivot axis;

a) between the back wall and the mounting body at least first, second and third links are disposed,
   b) a first link being joined through the rotary receptacle to the mounting body and a third link to the back wall through an additional lockable rotary receptacle which has an additional pivot axis which passes through the back wall and is parallel to the optical axis, whereby the protective housing can be rotated relative to said third link and to the at least one additional pivot axis;
   c) the links encompass a cable carrying passage leading to the cable entrance in the back wall;
   d) said first link and said third link have each a partially spherical shell whose outside surfaces are directed against one another and which have each an opening, the first pivot axis and the second pivot axis, both standing vertically one on the other, pass through the center point of the partially spherical shell of said first link, and that the third pivot axis passes through the center of the partially spherical shell of said third link;
   e) said second link being configured as a rectilinear hollow body and passing through the openings for rotation about the centers of said partially spherical shells;
   f) in the interior of said partially spherical shells thrust bodies having external rotation surfaces which at least partially cover over the openings and being joined in a tension-resistant manner to two ends of said second link; and wherein
   g) clamping means are provided by which said two thrust bodies, and with them said second link, can be locked to said partially spherical shells against rotation and displacement.

15. The protective housing according to claim 14, wherein said first, second and third links, said pivot axes and lying between the links are parallel to one another.

16. The protective housing according to claim 14, wherein said third link is inserted by means of a rotary annular flange into the lockable rotary receptacle in the back wall of the protective housing.

* * * * *